US007369710B2

(12) United States Patent
Yoshida

(10) Patent No.: US 7,369,710 B2
(45) Date of Patent: May 6, 2008

(54) IMAGE PROCESSING DEVICE, IMAGE PROCESSING METHOD AND IMAGE PROCESSING PROGRAM

(75) Inventor: Yasunari Yoshida, Ama-gun (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 800 days.

(21) Appl. No.: 10/925,910

(22) Filed: Aug. 26, 2004

(65) Prior Publication Data

US 2005/0046903 A1   Mar. 3, 2005

(30) Foreign Application Priority Data

Aug. 29, 2003   (JP)   ............................. 2003-307230

(51) Int. Cl.
*G06K 9/36* (2006.01)
*G06K 9/46* (2006.01)
(52) U.S. Cl. .................. 382/252; 382/270; 358/3.03
(58) Field of Classification Search ................ 382/162, 382/252, 270; 358/3.03, 3.04, 3.05, 3.22
See application file for complete search history.

(56) References Cited

U.S. PATENT DOCUMENTS 4,449,150 A    5/1984   Kato 5,880,857 A *  3/1999   Shiau et al. ............... 358/3.03
6,402,281 B1*  6/2002   Nakahara et al. ............ 347/15
7,177,051 B2*  2/2007   Usui et al. ................. 358/3.05

FOREIGN PATENT DOCUMENTS

JP   A 57-119564   7/1982
JP   A 57-125579   8/1982

* cited by examiner

*Primary Examiner*—Phuoc Tran
(74) *Attorney, Agent, or Firm*—Oliff & Berridge, PLC

(57) ABSTRACT

An image processing device performs an error diffusion on multilevel input image data to generate multilevel output image data that has fewer levels than the multilevel input image data. The image processing device includes a plurality of setting devices, each of which sets a threshold value to be used at the error diffusion, a threshold value selecting device that randomly selects one of the plurality of setting devices with respect to each pixel to be processed and allows the selected setting device to set a threshold value with respect to the pixel to be processed when the image processing device performs the error diffusion, and a converting device that converts the pixel to be processed into multilevel output image data with fewer levels than multilevel input image data by the error diffusion, in accordance with the threshold value set by the setting device selected by the threshold value selecting device. The plurality of setting devices includes at least a first setting device and a second setting device that sets a threshold value which is higher than a threshold value set by the first setting device.

19 Claims, 17 Drawing Sheets

152

|  -  | 1/2 |  -  |
|-----|-----|-----|
| 1/2 |  *  |  -  |

FIG.17

| - | - | 1/4 | 1/4 | - |
|---|---|---|---|---|
| 1/4 | 1/4 | * | - | - |

FIG.18

| - | 1/4 | 1/4 | 1/4 | - |
|---|---|---|---|---|
| - | 1/4 | * | - | - |

FIG.19 RELATED ART

| 1/48 | 3/48 | 5/48 | 3/48 | 1/48 |
|---|---|---|---|---|
| 3/48 | 5/48 | 7/48 | 5/48 | 3/48 |
| 5/48 | 7/48 | * | - | - |

IMAGE PROCESSING DEVICE, IMAGE PROCESSING METHOD AND IMAGE PROCESSING PROGRAM

This application claims priority from JP 2003-307230, filed Aug. 29, 2003, the subject matter of which is incorporated herein in its entirety by reference thereto.

BACKGROUND OF THE INVENTION

1. Field of Invention

The invention relates to an error diffusion that generates multilevel output image data having fewer levels than multilevel input image data.

2. Description of Related Art

Conventionally, the error diffusion is known as a technique to generate multilevel output image data (e.g. bi-level output image data) from multilevel input image data, wherein the output image data has fewer levels than the input image data. The error diffusion of binarizing 256 levels input image data will be briefly described below.

First, a density I of a pixel to be processed (a subject pixel) of input image data is modified to obtain a modified density I', with the addition of binary conversion errors e distributed to pixels located in a neighborhood of the subject pixel. More specifically, a binary conversion error e, for a pixel on which a binarization has been performed and caused at the pixel by the binarization, is stored. The binary conversion errors e are added to the subject pixel density I, according to the positions of the neighboring pixels with respect to the subject pixel. Percentages of the binary conversion errors e to be added to the subject pixel density I are determined based on an error distribution matrix as shown in FIG. 19. In the error distribution matrix of FIG. 19, each numeric value represents a weight coefficient according to a position of each neighboring pixel with respect to a subject pixel (*). In accordance with the error distribution matrix, as to each neighboring pixel of the subject pixel, its binary conversion error e is multiplied by a weight coefficient corresponding to the neighboring pixel. The obtained values are then added to the subject pixel density I to obtain a modified density I' of the subject pixel.

Then, the obtained modified density I' and a predetermined fixed threshold value T (e.g. T=128) are compared with each other. As a result of the comparison, when the modified density I' is greater than or equal to the fixed threshold value T, an output density O is set to 255. When the modified density I' is below the fixed threshold value T, the output density O is set to zero (0).

Then, the difference between the modified density I' and the output density O is stored as a binary conversion error e of the pixel. By performing the above process on each pixel of the input image data, bi-level output image data is generated.

SUMMARY OF THE INVENTION

However, when an image having low and uniform density is processed, the above error diffusion is likely to cause moiré on the output image because dots are regularly generated and placed in the output image. Therefore, it is required to make the moiré less likely to develop on the output image by using a large-sized error distribution matrix. However, because the large-sized error distribution matrix is so large, a long processing time is required for the error diffusion. The processing time becomes longer with increases in the size of the error distribution matrix.

U.S. Pat. No. 4,449,150 discloses an error diffusion that prevents the occurrence of moiré by randomly setting a threshold value T pixel by pixel. As described above, if the threshold value T is randomly set every pixel to be processed, dots are not regularly placed, preventing the occurrence of the moiré on output image. However, with the such error diffusion, unevenness is developed on the output image due to the random dot placement.

The invention provides a technique to reduce the tendency to cause moiré and unevenness on the output image.

According to one exemplary aspect of the invention, an image processing device performs an error diffusion on multilevel input image data to generate multilevel output image data that has fewer levels than the multilevel input image data. The image processing device includes a plurality of setting devices, each of which sets a threshold value to be used at the error diffusion, a threshold value selecting device that randomly selects one of the plurality of setting devices with respect to each pixel to be processed and allows the selected setting device to set a threshold value with respect to the pixel to be processed when the image processing device performs the error diffusion, and a converting device that converts the pixel to be processed into multilevel output image data with fewer levels than the multilevel input image data by the error diffusion, in accordance with the threshold value set by the setting device selected by the threshold value selecting device. The plurality of setting devices include at least a first setting device and a second setting device that sets a threshold value which averages higher than a threshold value set by the first setting device.

According to the image processing device, even when the error diffusion is performed on the input image with low and uniform density, a moiré or unevenness can be prevented from developing on the output image.

In the image processing device of the invention, the setting device, which is selected from the plurality of the setting devices, is allowed to set a threshold value. Accordingly, for example, a threshold value which is a low value and set by the first setting device allows the dots to be uniformly diffused, and a threshold value which is a high value and set by the second setting device prevents the development of a moiré. Thus, a small-sized error distribution matrix is used and a processing time is shortened. In addition, the development of the moiré and unevenness can be prevented.

According to another exemplary aspect of the invention, there is provided an image processing method of performing an error diffusion on multilevel input image data and generating multilevel output image data having fewer levels than the multilevel input image data. The image processing method includes receiving multilevel image data, randomly selecting one of a first process, which performs an error diffusion by setting a threshold value of a pixel to be processed in a first setting pattern of a plurality of setting patterns for setting a threshold value to be used at the error diffusion, and a second process, which performs an error diffusion by setting a threshold value in a second setting pattern for setting a threshold value which is higher than the threshold value set in the first setting pattern, of the plurality of setting patterns, when the error diffusion is performed with respect to each pixel to be processed, and the step of generating multilevel image data having fewer levels than the received multilevel image data, with respect to the pixel, by the selected process.

According to the image processing method, even when the error diffusion is performed on an input image with low and uniform density, a moiré or unevenness can be prevented from developing on an output image.

In the image processing method of the invention, one of the first process and the second process is selected to set a threshold value. Accordingly, for example, a threshold value which is set by the first setting pattern in the first process allows the dots to be uniformly diffused, and a threshold value which is higher than the threshold value set by the first setting pattern prevents the development of a moiré. Thus, a small-sized error distribution matrix is used and a processing time is shortened. In addition, the development of the moiré and unevenness can be prevented.

According to a further exemplary aspect of the invention, an image processing program is configured to operate a computer as an image processing device that performs an error diffusion on multilevel input image data to generate multilevel output image data with fewer levels than the multilevel input image data, a plurality of setting devices, each of which sets a threshold value to be used at the error diffusion, a threshold value selecting device that randomly selects one of the plurality of setting devices with respect to each pixel to be processed and allows the selected setting device to set a threshold value with respect to the pixel to be processed when the image processing device performs the error diffusion, and a converting device that converts the pixel to be processed into multilevel output image data with fewer levels than multilevel input image data by the error diffusion, in accordance with the threshold value set by the setting device selected by the threshold value selecting device. The plurality of setting devices include at least a first setting device and a second setting device that sets a threshold value which is higher than a threshold value set by the first setting device.

According to the image processing program, even when the error diffusion is performed on an input image with low and uniform density, a moiré or unevenness can be prevented from developing on an output image.

The image processing program of the invention is configured to operate the computer as the plurality of setting devices. The setting device, which is selected from the plurality of the setting devices, is allowed to set a threshold value. Accordingly, for example, a threshold value which is a low value and set by the first setting device allows the dots to be uniformly diffused, and a threshold value which is a high value and set by the second setting device prevents the development of a moiré. Thus, a small-sized error distribution matrix is used and a processing time is shortened. In addition, the development of the moiré and unevenness can be prevented. The image processing program may be stored in a computer-readable recording medium, for example, a CD-ROM and a floppy disk.

BRIEF DESCRIPTION OF THE DRAWINGS

Embodiments of the invention will be described in detail with reference to the following figures wherein:

FIG. 17 is an explanatory diagram of a first variation of the error distribution matrix;

FIG. 18 is an explanatory diagram of a second variation of the error distribution matrix; and FIG. 19 is an explanation diagram of a conventional error distribution matrix.

DETAILED DESCRIPTION OF PREFERRED EMBODIMENTS

Figure 1:
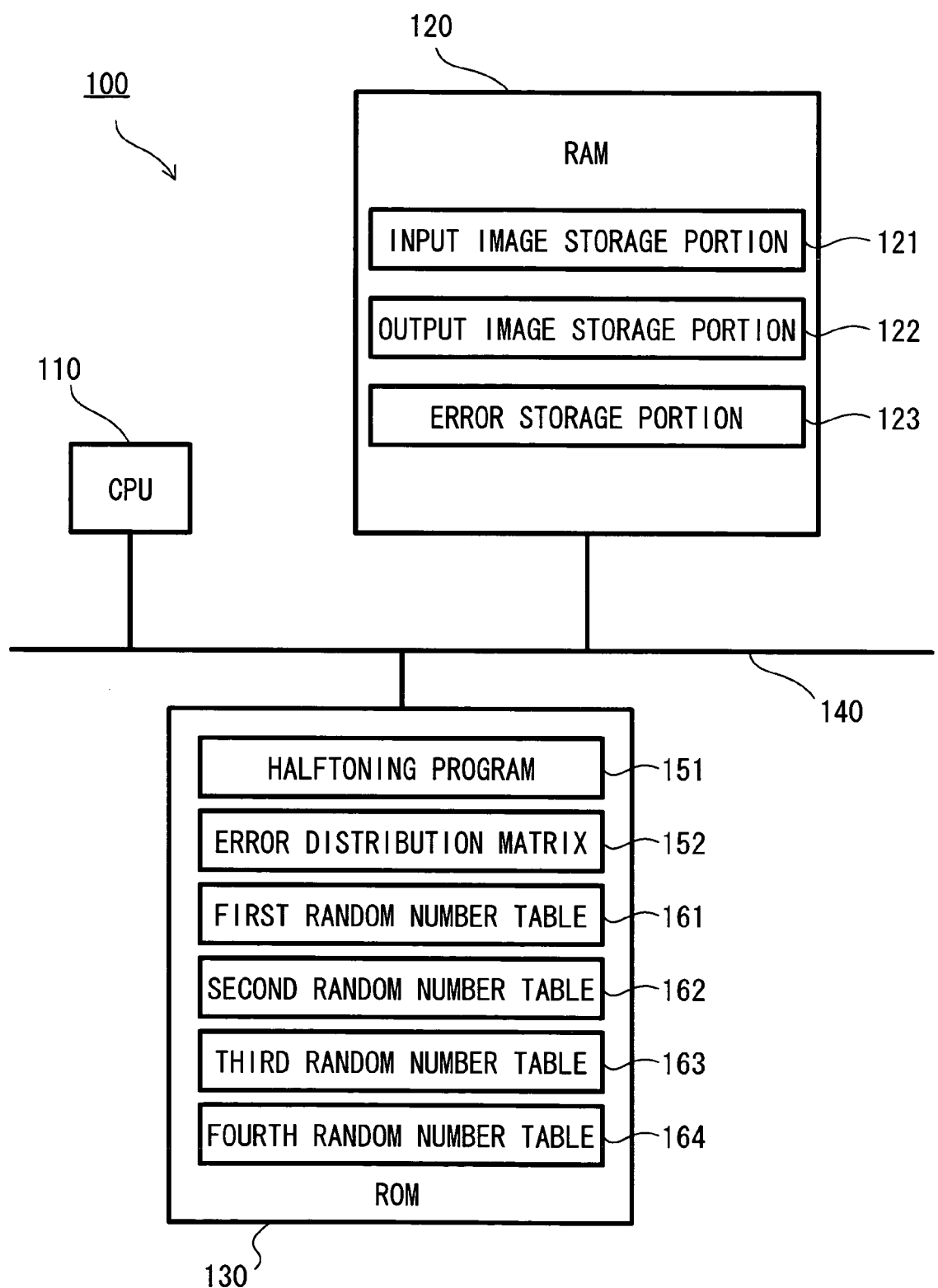
FIG. 1 is a block diagram showing a schematic configuration of a printer according to a first exemplary embodiment.

A printer 100 of FIG. 1 of a first exemplary embodiment has a function of generating pseudo-halftone output image data by binarizing 256 levels of input image data (a multilevel range of zero (0) to 255) by an error diffusion. As shown in FIG. 1, the printer 100 includes a CPU 110, a RAM 120 and a ROM 130, which are connected with each other by a bus 140.

The RAM 120 includes an input image storage portion 121 that stores input image data, an output image storage portion 122 that stores output image data obtained by binarization of the input image data, and an error storage portion 123 that stores a binary conversion error e caused by the binarization.

The input image data includes four kinds of input image data, namely, black (K) image data, cyan (C) image data, magenta (M) image data and yellow (Y) image data, which correspond to respective print colors for printing a color image. The printer 100 generates output image data of each print color corresponding to the input image data of each print color. An image of each color generated based on each of the output image data is printed on a recording sheet so as to overlap each other, thereby presenting a color image on the recording sheet.

The ROM 130 stores a halftoning program (which functions as an image processing program) that allows the CPU 110 to perform halftoning to generate output image data which is obtained by binarizing 256 levels of input image data.

Figure 2:
FIG. 2 is an explanatory diagram of an error distribution matrix.

The ROM 130 stores an error distribution matrix 152 of FIG. 2. As shown in FIG. 2, the size of the error distribution matrix 152 used in the printer 100 is extremely small as compared with that of a conventional error distribution matrix (FIG. 19).

The ROM 130 further stores first to fourth random number tables 161, 162, 163, 164. Each of the first and second random number tables 161, 162 stores integral values in a range of −255 to 255, in random order, as random numbers. Each of the third and fourth random number tables 163, 164 stores integral values in a range of 64 to 192, in random order, as random numbers. The order of listing the random numbers is different between the first random number table 161 and the second random number table 162. Likewise, the order of listing the random numbers is different between the third random number table 163 and the fourth random number table 164.

Figure 3:
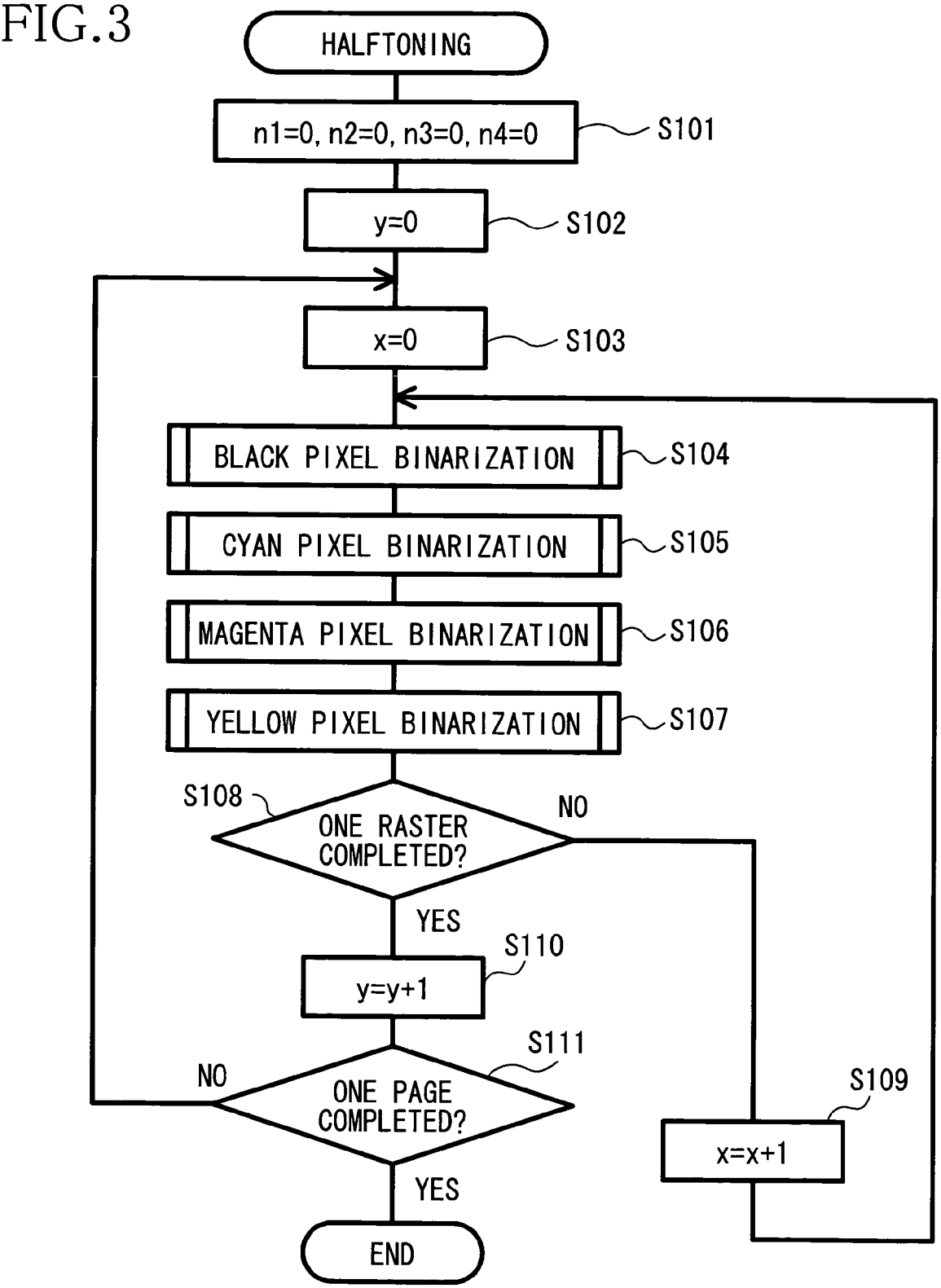
FIG. 3 is a flowchart of halftoning according to the first exemplary embodiment.

The halftoning to be executed by the CPU 110 according to the halftoning program 151 stored in the ROM 130 will be described with reference to FIG. 3. Before starting the halftoning, the error storage portion 123 of the RAM 120 is initialized to zero (0).

When the halftoning starts, at S101, values of variables n1 to n4, each of which represents a reference position of a random number in each random number table 161, 162, 163, 164, are set to respective initial values. More specifically, the value of the variable n1 representing a reference position of a random number in the first random number table 161, the value of the variable n2 representing a reference position of a random number in the second random number table 162, the value of the variable n3 representing a reference position of a random number in the third random number table 163, and the value of the variable n4, representing a reference position of a random number in the fourth random number table 164 are set to zero (0). Each variable n1, n2, n3, n4, representing a reference position of a random number in each random number table 161 to 164, takes on a value representing a stored position of the random number in each random number table 161, 162, 163, 164. For example, the first random number table 161 stores 511 random numbers in a range of −255 to 255, so that the variable n1 takes on an integral value in a range of zero (0) to 510, which represent the stored positions of the respective random numbers of −255 to 255. Therefore, for example, when the variable n1 is incremented by one, the value of the variable n1 is cyclically changed (0→1→2→ . . . →509→510→0→1→ . . . ). Although the order of the random numbers is different from that in the first random number table 161, the second random number table 162 also stores 511 random numbers in a range of −255 to 255, so that the variable n2 takes on an integral value in a range of zero (0) to 510, which represent the stored positions of the respective random numbers of −255 to 255. The third random number table 163 stores 129 random numbers in a range of 64 to 192, so that the variable n3 takes on an integer value in a range of zero (0) to 128, which represent the stored positions of the respective random numbers of 64 to 192. Therefore, for example, when the variable n3 is incremented by one, the value of the variable n3 is cyclically changed (0→1→2→ . . . →127→128→0→1→ . . . ). Although the order of the random numbers is different from that in the third random number table 163, the fourth random number table 164 stores 129 random numbers in a range of 64 to 192, so that the variable n4 takes on an integer value in a range of zero (0) to 128, which represent the stored positions of the respective random numbers of 64 to 192.

Then, in steps S102 and S103, values of variables x and y are set to zero (0), which is an initial value, in order to determine the position of a pixel to be subjected to a binarization, i.e., the position of a subject pixel.

At S104, a black (K) pixel binarization is performed. At this binarization, an output density O of the subject pixel (x, y) is obtained by binarizing the subject pixel of the black (K) input image data stored in the input image storage portion 121, and the obtained output density O is stored in the output image storage portion 122. The detailed description of the black pixel binarization will be described later.

At S105, in a similar fashion to S104, a cyan (C) pixel binarization is performed. At this binarization, an output density O of the subject pixel (x, y) is obtained by binarizing the subject pixel of the cyan (C) input image data stored in the input image storage portion 121, and the obtained output density O is stored in the output image storage portion 122.

At S106, in a similar fashion to S104 and S105, a magenta (M) pixel binarization is performed. At this binarization, an output density O of the subject pixel (x, y) is obtained by binarizing the subject pixel of the magenta (M) input image data stored in the input image storage portion 121, and the obtained output density O is stored in the output image storage portion 122.

At S107, in a similar fashion to S104 to S106, an yellow (Y) pixel binarization is performed. At this binarization, an output density O of the subject pixel (x, y) is obtained by binarizing the subject pixel of the yellow (Y) input image data stored in the input image storage portion 121, and the obtained output density O is stored in the output image storage portion 122.

At S108, it is determined whether one raster (one line) of the binarization has been completed, i.e., whether the binarization in a main scanning direction (an x-axis direction) has been completed. When one raster of the binarization has not been completed (S108:NO), flow moves to S109. At S109, one (1) is added to the value of the variable x to move the subject pixel position x, by one pixel (or column), in the main scanning direction. Then, flow goes back to S104 and the steps subsequent to S104 are performed again. When one raster of the binarization has been completed (S108:YES), flow moves to S110. At S110, one (1) is added to the value of the variable y to move the subject pixel position y, by one line, in a sub-scanning direction (in a y-axis direction).

Then, at S111, it is determined whether one page of the binarization has been completed.

When one page of the binarization has not been completed (S110:NO), flow goes back to S103 and the steps subsequent to S103 are performed again. When one page of the binarization has been completed (S110:YES), the halftoning is finished.

By performing the halftoning as described above, the output image data of each print color is generated and stored in the output image storage portion 122.

Figure 4:
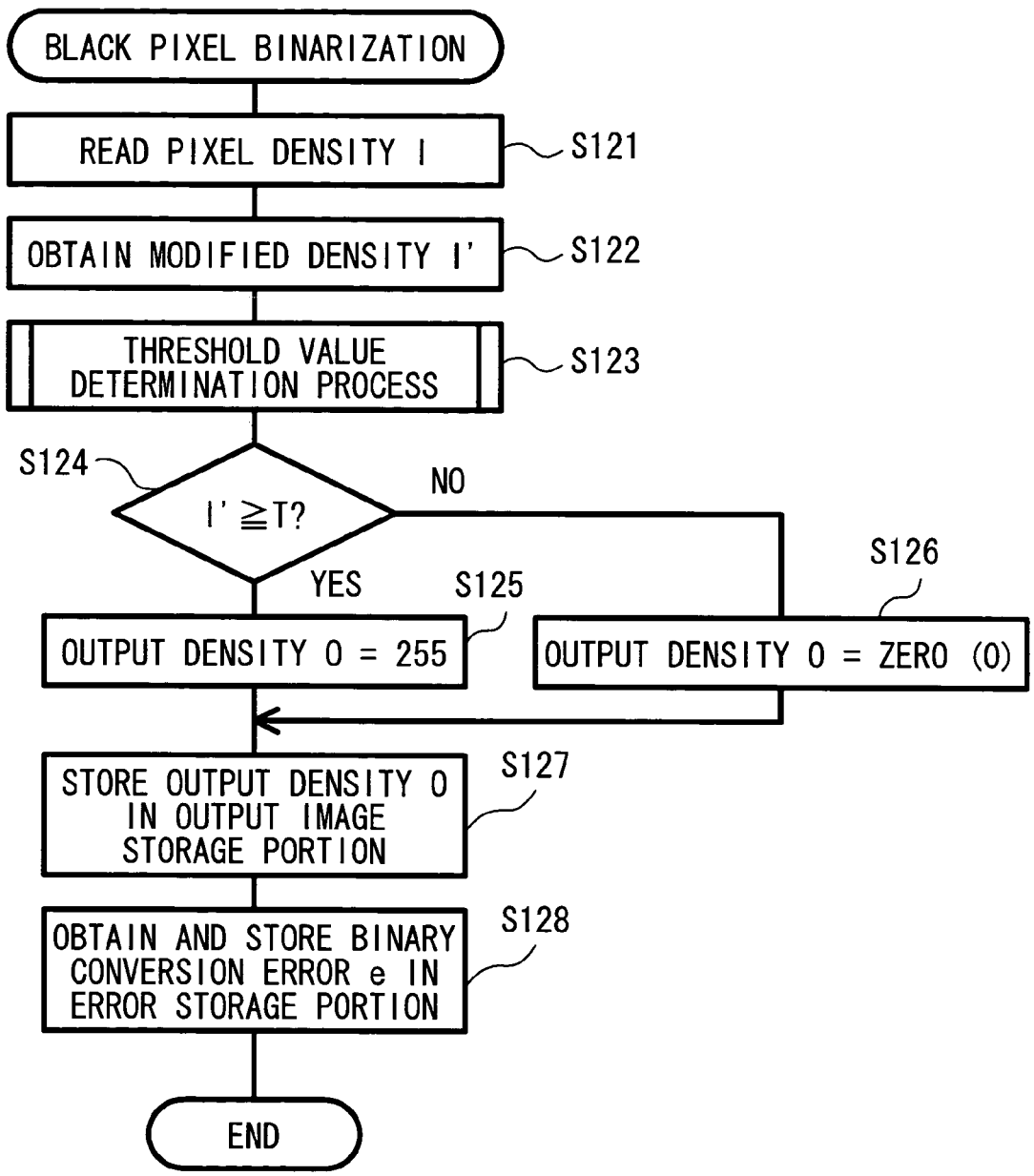
FIG. 4 is a flowchart of a black pixel binarization.

The black pixel binarization performed at S104 of the halftoning (FIG. 3) will be described with reference to FIG. 4. The black pixel binarization of the embodiment is basically the same as the conventional binarization. In the binarization of the embodiment, however, a threshold value T is determined by a threshold value determination process at S123. The cyan pixel binarization, the magenta pixel binarization, and the yellow pixel binarization performed at S105, S106 and S107, respectively, are the same as the black pixel binarization, except for the print color of the image data to be processed. Accordingly, explanations for those binarizations will be omitted.

When the black pixel binarization starts, at S121, a density I ($0 \leq I \leq 255$) of the subject pixel (x, y) of the black (K) input image data is read from the input data image storage portion 121.

At S122, the subject pixel density I read at S121 is modified to obtain a modified density I', with the addition of binary conversion errors e, which are distributed to pixels located in a neighborhood of the subject pixel and are stored in the error storage portion 123. More specifically, based on the error distribution matrix 152 (FIG. 2) stored in the ROM 130, with respect to each neighboring pixel assigned a weight coefficient (=½ in this example) with respect to the subject pixel (*), the binary conversion error e caused by the black binarization of the neighboring pixel is multiplied by the weight coefficient assigned to the neighboring pixel. Then, all the obtained values as to the neighboring pixels are added to the subject pixel density I to obtain the modified density I' of the subject pixel, as shown in Formula (1) below. In Formula (1), "ij" represents a relative position with respect to the subject pixel. In the embodiment, as to the neighboring pixel of (i, j)=(−1, 0) and the neighboring pixel of (i, j)=(0, −1), a multiplication value of the binary conversion error e of the black binarization and the weight coefficient is obtained.

$$I'=I+\Sigma(e_{ij} \times \text{weight coefficient}_{ij}) \quad \text{Formula (1)}.$$

At S123, the threshold value determination process is performed to determine a threshold value T. The detailed description of the threshold value determination process will be provided later.

At S124, it is determined whether the modified density I', obtained at S122, is greater than or equal to the threshold value T determined at S123. When the modified density I' is greater than or equal to the threshold value T (S124:YES), flow moves to S125 to set the black output density O of the subject pixel (x, y) to 255. Then, flow moves to S127.

When the modified density I' is less than the threshold value T (S124:NO), flow moves to S126 to set the black output density O of the subject pixel (x, y) to zero (0). Then, flow moves to S127. At S127, the value of the black output density O of the subject pixel (x, y) is stored in the output image storage portion 122.

Then, at S128, a binary conversion error e caused by the binarization is obtained by Formula (2) below. The obtained value is stored in the error storage portion 123 as a binary conversion error e of black binarization of the pixel (x, y). Then, the black pixel binarization is finished.

$$e=I'-O \quad \text{Formula (2)}.$$

Figure 5:
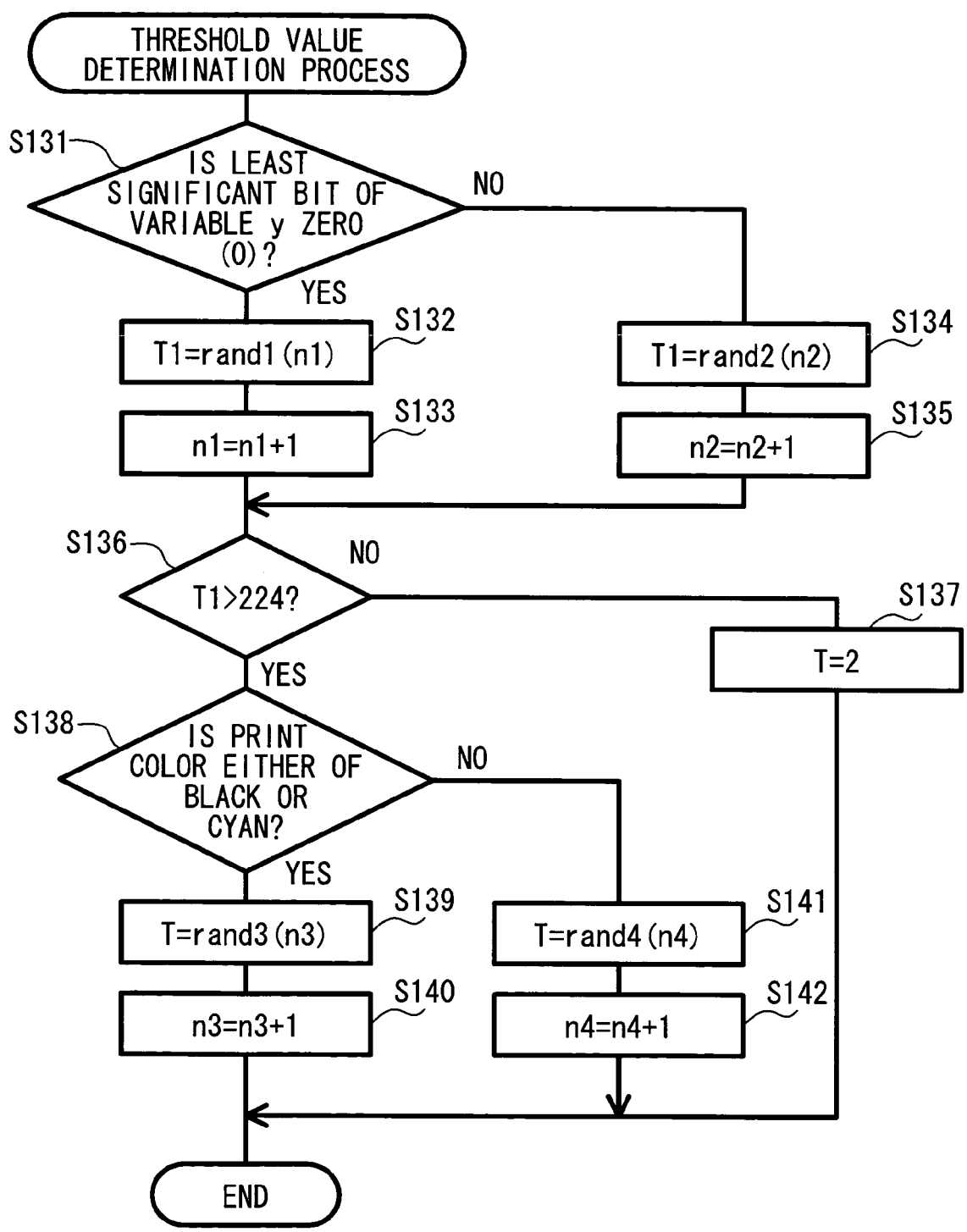
FIG. 5 is a flowchart of a threshold value determination process according to the first exemplary embodiment.

Next, the threshold value determination process performed at S123 of the black pixel binarization (FIG. 4) will be described with reference to FIG. 5. The threshold value determination process is a common process to be performed at the black pixel binarization (S104), the magenta pixel binarization (S105), the cyan pixel binarization (S106), and the yellow pixel binarization (S107) of the halftoning (FIG. 3).

When the threshold value determination process starts, at S131, it is determined whether a least significant bit of the variable y represented in binary notation is zero (0).

When the least significant bit is zero (0) (S131:YES), flow moves to S132. At S132, a random number, which exists at the reference position indicated by the variable n1 in the first random number table 161, is substituted into a variable T1. Then, at S133, one (1) is added to the value of the variable n1. After that, flow moves to S136.

When the least significant bit is not zero (0), i.e., when the least significant bit is one (1) (S131:NO), flow moves to S134. At S134, a random number, which exists at the reference position indicated by the variable n2 in the second random number table 162, is substituted into the variable T1. Then, at S135, one (1) is added to the variable n2. After that, flow moves to S136.

At S136, it is determined whether the value of the variable T1 is greater than 224.

When the value of the variable T1 is not greater than 224 (i.e., the variable T1 is smaller than or equal to 224) (S136:NO), flow moves to S137. At S137, a value of 2 is determined as the threshold value T and the threshold value determination process is finished.

When the value of the variable T1 is greater than 224 (S136:YES), flow moves to S138. At S138, it is determined whether the print color of the input image data being processed is either of black (K) or cyan (C). That is, when the threshold value determination process is performed at S104 of the black pixel binarization or at S105 of the cyan binarization during the halftoning (FIG. 3), it is determined that the print color of the input image data being processed is either of black (K) or cyan (C). When the threshold value determination process is performed at S106 of the magenta pixel binarization or at S107 of the yellow binarization during the halftoning, it is determined that the print color of the input image data being processed is not either of black (K) or cyan (C), i.e., the print color is either of magenta (M) or yellow (Y). When the print color is either of black (K) or cyan (C) (S138:YES), flow moves to S139. At S139, a value of a random number, which exists at the reference position indicated by the variable n3 in the third random number table 163, is determined as the threshold value T. Then, at S140, one (1) is added to the value of the variable n3. After that, the threshold value determination process is finished.

When the print color is not either of black (K) or cyan (C), i.e., when the print color is either of magenta (M) or yellow (Y) (S138:NO), flow moves to S141. At S141, a value of a random number, which exists at the reference position indicated by the variable n4 in the fourth random number table 164, is determined as the threshold value T. Then, at S142, one (1) is added to the value of the variable n4. After that, the threshold value determination process is finished.

As described above, at the threshold value determination process, either of the small threshold value T (T=2) or the high threshold value T (T=a random number in the range of 64 to 192) is randomly selected at S136 of the threshold value determination process. When the value of the variable T1 is greater than 224 at S136 of the determination process (S136:YES), the threshold value T is determined by selecting a value from the third random number table 163 or the fourth random number table 164, each of which stores 129 random numbers in the range of 64 to 192. The variable T1 takes on a value (in a range of −255 to 255) of one of the random numbers stored in the first random number table 161 or the second random number table 162. Therefore, when the variable T1 is a value of between −255 and 224, it is determined, at S136, that the variable T1 is smaller than or equal to 224. When the variable T1 is a value of between 225 and 255, it is determined, at S136, that the variable T1 is greater than 224. Accordingly, the ratio of selecting the small threshold value T to the high threshold value T is 480:31 (about 15:1). That is, the probability of selecting the small threshold value T is much higher than the probability of selecting the high threshold value T. The preferable range of the ratio of selecting the small threshold value T to the high threshold value T is between 1:1 and 63:1. When the probability of selecting the high threshold value T is one time or higher with respect to the probability of selecting the low threshold value T, the frequency of occurrence of unevenness becomes high. When the probability of selecting the high threshold value T is 1/63rd or lower with respect to the probability of selecting the low threshold value T, an effect of reducing the development of moiré cannot be obtained.

As described above, at the halftoning of the printer 100, the low threshold value T (T=2) is selected with high probability. Therefore, as is the case with performing the error diffusion by using a fixed threshold value, dots can be uniformly diffused. In addition, at the halftoning of the embodiment, the high threshold value T (T=a random number in the range of 64 to 192) is selected with low probability, so that a tendency to generate dots in regular arrangement can be reduced.

Figure 6A:
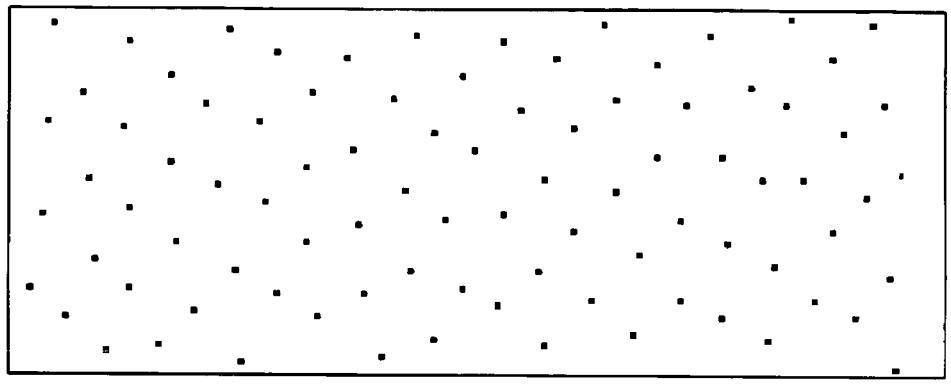
FIGS. 6A to 6C are explanatory diagrams showing dot generating conditions.
Figure 6B:
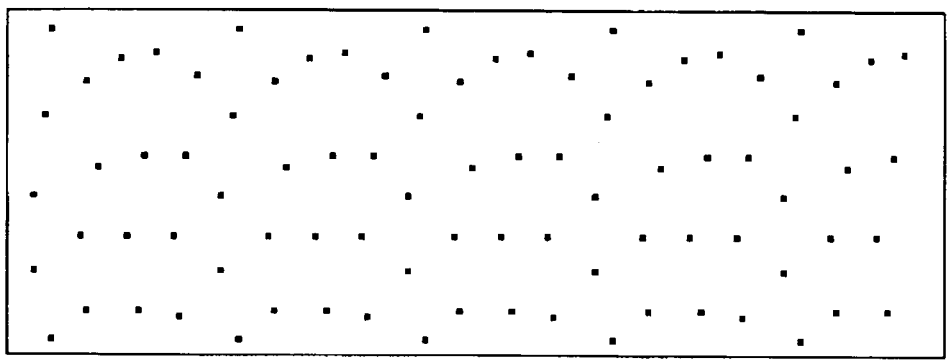
Figure 6C:
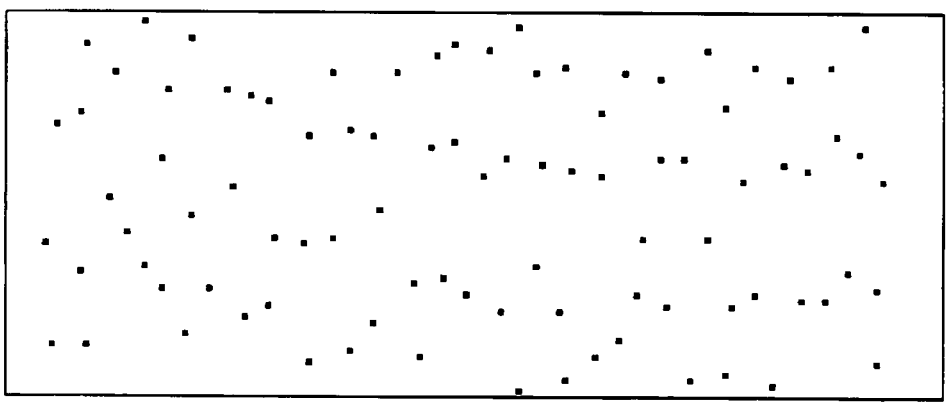

Referring to FIGS. 6A to 6C, the actual dot generating conditions when an image having low and uniform density is binarized, will be described below. FIGS. 6A to 6C show dot generating conditions when the error diffusion is performed by using the error distribution matrix 152 of FIG. 2.

As shown in FIG. 6B, when the error diffusion is performed by using a fixed threshold value, the dots can be uniformly diffused. However, because the dots are regularly generated and placed, a moiré easily appears on the output. In this example, it appears to human eyes as if the dots are arranged so as to make wavelike lines in the horizontal direction.

As shown in FIG. 6C, when the error diffusion is performed by which a threshold value is randomly set to each pixel to be processed, the occurrence of the moiré can be prevented. However, even though the input image has a uniform density, it appears to human eyes as if the dots are not substantially uniformly diffused, and unevenness occurs on the output.

As shown in FIG. 6A, when the halftoning of the printer 100 is performed, the development of the moiré is prevented. In addition, the dots are substantially uniformly diffused, so that unevenness is less likely to occur.

In the printer 100 of the first embodiment, the processes of S137, S139 and S141 of the threshold value determination process (FIG. 5) function as a setting device. Particularly, the process of S137 functions as a first setting device, and the processes of S139 and S141 function as a second setting device. The processes of S131 to S136 function as a threshold value selecting device. The process of S138 functions as a random number generator selecting device. Each random number table 161 to 164 functions as a random number generator.

As described above, in the printer 100 of the first embodiment, by the threshold value determination process, the low threshold value T (T=2) is selected with high probability and the high threshold value T (T=a random number in the range of 64 to 192) is selected with low probability. Therefore, according to the printer 100 of the embodiment, when the binarization is performed on the input image having low and uniform density, the moiré and unevenness are unlikely to be developed on the output image. Accordingly, the small-sized error distribution matrix 152 can used, so that the processing time can be shortened.

In the printer 100, the high threshold value T takes on a random number in the range of 64 to 192. Therefore, according to the printer 100, the effect of preventing the regular dot placement can be increased.

Further, in the printer 100, the random numbers are generated by using the first to fourth random number tables 161 to 164. Therefore, according to the printer 100, the processing speed can be improved as compared with a case where the random numbers are generated by calculation.

Particularly, in the printer 100, at the threshold value determination process (FIG. 5), the random number table to be used for determining the value of the variable T1 is changed between the first and second random number tables 161, 162, depending on the case where the least significant bit of the variable y is zero (0) or one (1) (S131). Therefore, according to the printer 100, the regular dot placement can be further surely prevented. That is, if the same random number table is always used regardless of the value of the least significant bit of the variable y, in the case where the number of random numbers to be referred to from the random number table for processing one line of image data is the same as the number of random numbers stored in the random number table, a low threshold value and a high threshold value are selected in the same order at the processes of adjacent lines, so that dots may be regularly generated and placed in the sub-scanning direction (in the y-axis direction). In contrast to this, at the threshold value determination process of the first embodiment, because either appropriate random number table 161 or 162 is selected and used in order to determine the value of the variable T1 line by line, the dots can be prevented from being regularly generated and placed.

In addition, in the printer 100, at the threshold value determination process (FIG. 5), the random number table to be used for determining the threshold value T is changed between the third random number table 163 and the fourth random number table 164, depending on the print color of the input image data being processed (S138). Therefore, according to the printer 100, the dot generating pattern can be changed on a print color basis, so that dots of each color can be prevented from overlapping each other. As a result, the saturation of the color image can be improved. That is, the colors of the printed image are basically expressed by the subtractive color mixture, in which dots of each color overlap each other. When the dots are laterally placed without overlapping each other, the effect of the additive color mixture can be obtained.

In the printer 100 of the first exemplary embodiment, at S131 of the threshold value determination process (FIG. 5), it is determined whether the least significant bit is zero (0) when the variable y is represented in binary notation. However, it is not limited to the described embodiment.

For example, at S131, it may be determined whether the two lowermost bits of the variable y represented in binary notation are zero (0). In this case, the first random number table 161 is used at one raster of the process of four rasters of the processes, and the second random number table 162 is used at the other three rasters of the processes.

For example, a random number whose value is changed may be generated every time one raster of the process is finished (or after m-lines, or m-rasters, are processed), and at S131, it may be determined whether the least significant bit of the random number represented in binary notation is zero (0). By doing so, either of the first random number table 161 or the second random number table 162 is randomly selected every one raster of the process, so that the regular dot generation can be further prevented.

In the printer 100 of the first exemplary embodiment, at S138 of the threshold value determination process (FIG. 5), it is determined whether the print color of the input image data being processed is either of black (K) or cyan (C), and either of the third random number table 163 or the fourth random number table 164 is used according to the result. However, it is not limited to the embodiment. For example, a random number table is prepared for each print color, i.e., four random number tables are prepared, so that the different random number table is used for each print color. However, it is more advantageous to use two random number tables like the first embodiment than using four random number tables, because such requires the ROM 130 to store a smaller number of random number tables.

Figure 7:
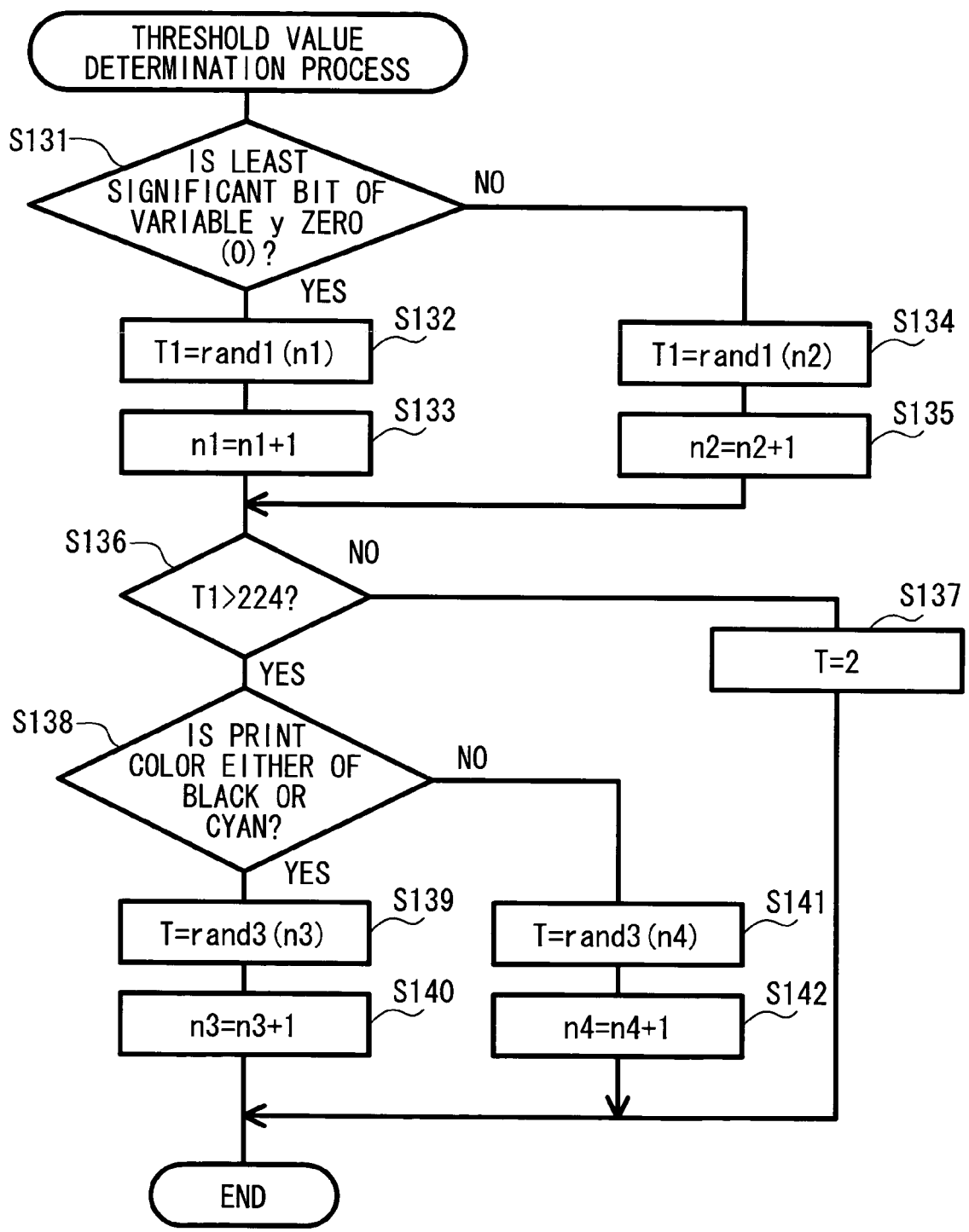
FIG. 7 is a flowchart of a first variation of the threshold value determination process.

In the printer 100 of the first exemplary embodiment, the random number table (the first and second random number tables 161, 162) to be used for determining the value of the variable T1 and the random number table (the third and fourth random number tables 163, 164) to be used for determining the threshold value T are changed, but the invention is not limited to the exemplary embodiment. For example, as shown in FIG. 7, a common random number table may be used in order to determine the value of the variable T1 and another common random number table may be used in order to determine the threshold value T. In other words, at a threshold value determination process of FIG. 7, the first random number table 161 is used in common at both S132 and S134 and the third random number table 163 is used in common at both S139 and S141. However, in this case, at S101 of the halftoning (FIG. 3), the initial values of the variables n1, n2 are set to different values from each other (for example, n1=0, n2=100) and the initial values of the variables n3, n4 are also set to different values from each other (for example, n3=0, n4=50). By doing so, even when the common random number tables are used to determine the value of the variable T1 and the threshold value T, the same effect as that obtained by the case where the random number tables to be used are changed like the threshold value determination process of FIG. 5, can be obtained. At the threshold value determination process of FIG. 7, the process of S138 functions as a variable selecting device.

Figure 8:
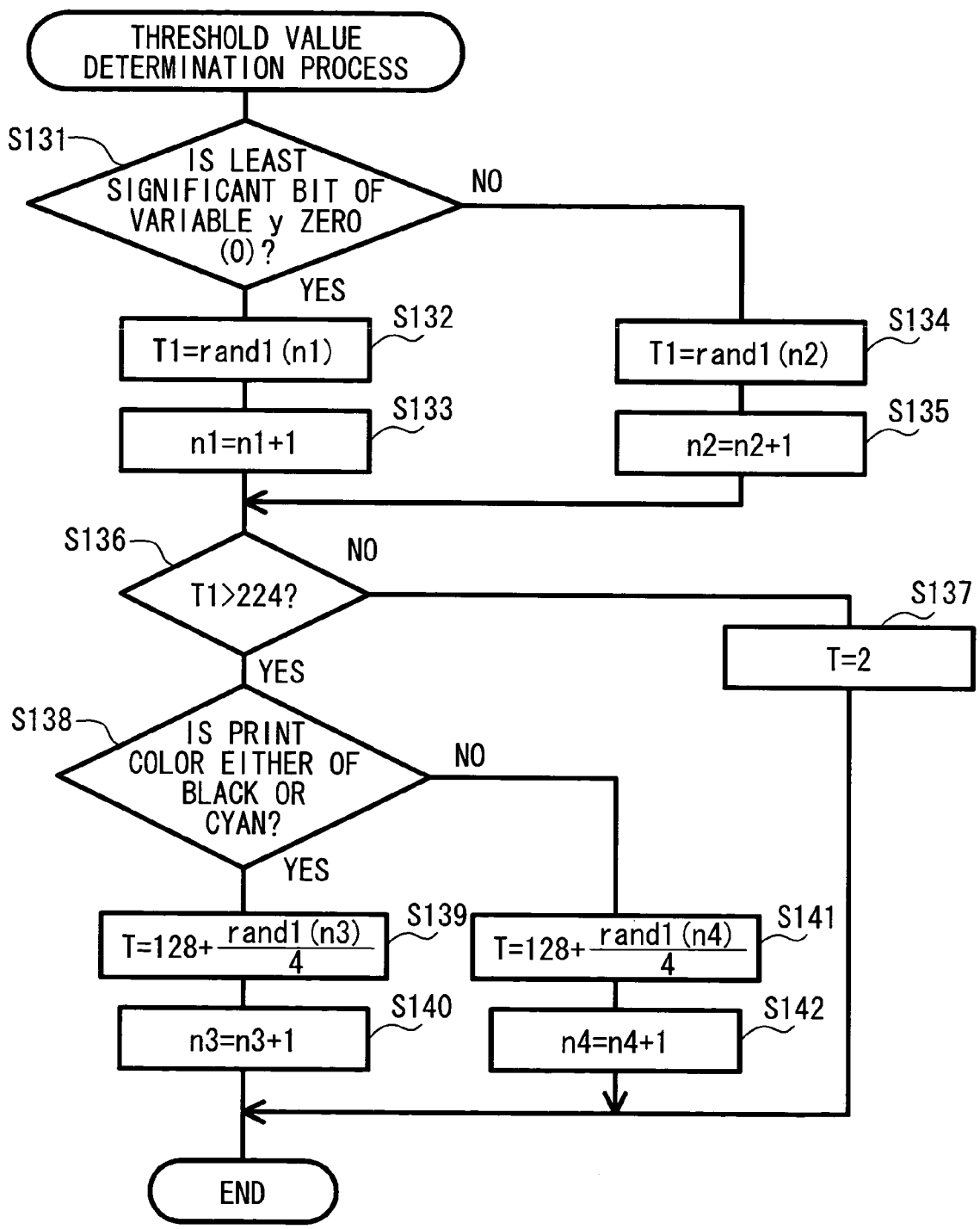
FIG. 8 is a flowchart of a second variation of the threshold value determination process.

Further, a common random number table may be used in order to determine the value of the variable T1 and the threshold value T. In other words, at a threshold value determination process of FIG. 8, the first random number table 161 is used in common at S132, S134, S139 and S141. In this case, the first common random number table 161, which stores 511 random numbers in the range of −255 to 255, is used, so that each variable n1, n2, n3, n4 takes on an integral value in the range of zero (0) to 510, each of which represents the stored position of each random number between −255 to 255. Therefore, at S101 of the halftoning (FIG. 3), the initial values of the variables n1 to n4 are set to different values from each other (for example, n1=0, n2=100, n3=200, n4=300). By doing so, even when the common random number table is used in order to determine the value of the variable T1 and the threshold value T, the same effect as that obtained by the case where the random number tables to be used are changed like the threshold value determination process of FIG. 5, can be obtained. At the threshold value determination process of FIG. 8, the process of S138 functions as a variable selecting device. When the value obtained at S139 or S141 includes decimal places, the decimal places of the value may be rounded off, up or down to an integer. When the value obtained at S139 or S141 is smaller than 64, the value may be set to 64, and when the value is greater than 192, the value may be set to 192.

Figure 9:
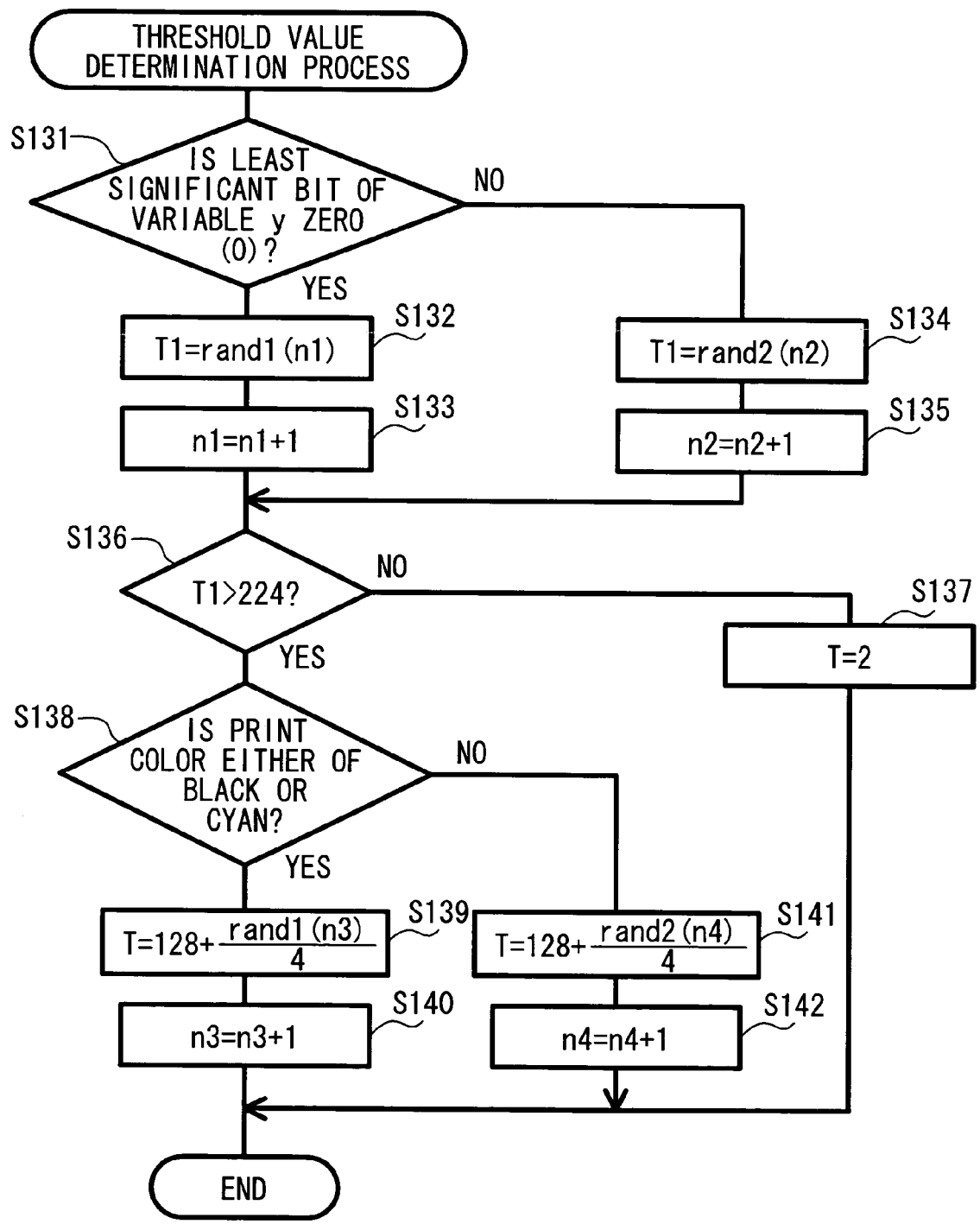
FIG. 9 is a flowchart of a third variation of the threshold value determination process.

At a threshold value determination process of FIG. 9, the first random number table 161 is used in common at both S132 and S139 and the second random number table 162 is used in common at both S134 and S141. In this case, also, the first common random number table 161 and the second common random number table 162, each of which stores 511 random numbers in the range of −255 to 255, are used, so that each variable n1, n2, n3, n4 takes on an integral value in the range of zero (0) to 510, each of which represents the stored position of each random number between −255 to 255. Therefore, at S101 of the halftoning (FIG. 3), the initial values of the variables n1, n3, and the initial values of the variables n2, n4 may be set to different values from each other (for example, n1=0, n3=100, n2=0, n4=100). By doing so, even when one common random number table is used in order to determine the value of the variable T1 and another common random number table is used in order to determine the threshold value T, the same effect, that is obtained by the case where the random number tables to be used are changed like the threshold value determination process of FIG. 5, can be obtained. As in the case of FIG. 8, at the threshold value determination process of FIG. 10, when the value obtained at S139 or S141 includes decimal places, the decimal places of the value may be rounded off, up or down to an integer. When the value obtained at S139 or S141 is smaller than 64, the value may be set to 64, and when the value is greater than 192, the value may be set to 192.

Figure 10:
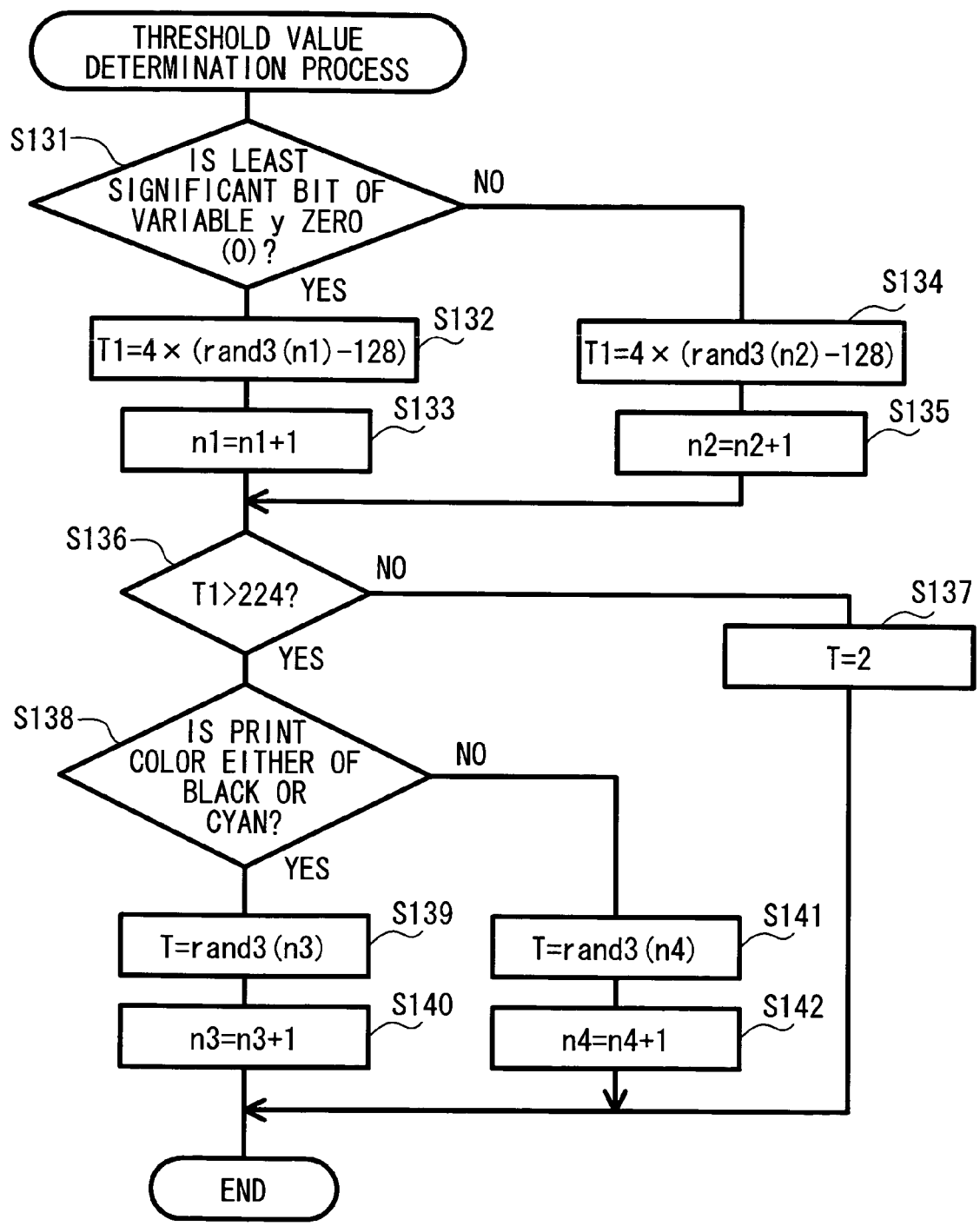
FIG. 10 is a flowchart of a fourth variation of the threshold value determination process.

At a threshold value determination process of FIG. 10, the third random number table 163 is used in common at S132, S134, S139 and S141. In this case, the third common random number table 163, which stores 129 random numbers in the range of 64 to 192, is used, so that each variable n1, n2, n3, n4 takes on an integral value in the range of zero (0) to 128, each of which represents the stored position of each random number between 64 to 192. Therefore, at S101 of the halftoning (FIG. 3), the initial values of the variables n1 to n4 may be set to different values from each other (for example, n1=0, n2=30, n3=60, n4=90). By doing so, even when the common random number table is used in order to determine the value of the variable T1 and the threshold value T, the same effect that is obtained by the case where the random number tables to be used are changed like the threshold value determination process of FIG. 5, can be obtained. At the threshold value determination process of FIG. 10, the process of S138 functions as a variable selecting device. When the value obtained at S132 or S134 is smaller than −255, the value may be set to −255, and when the value is greater than 255, the value may be set to 255.

Figure 11:
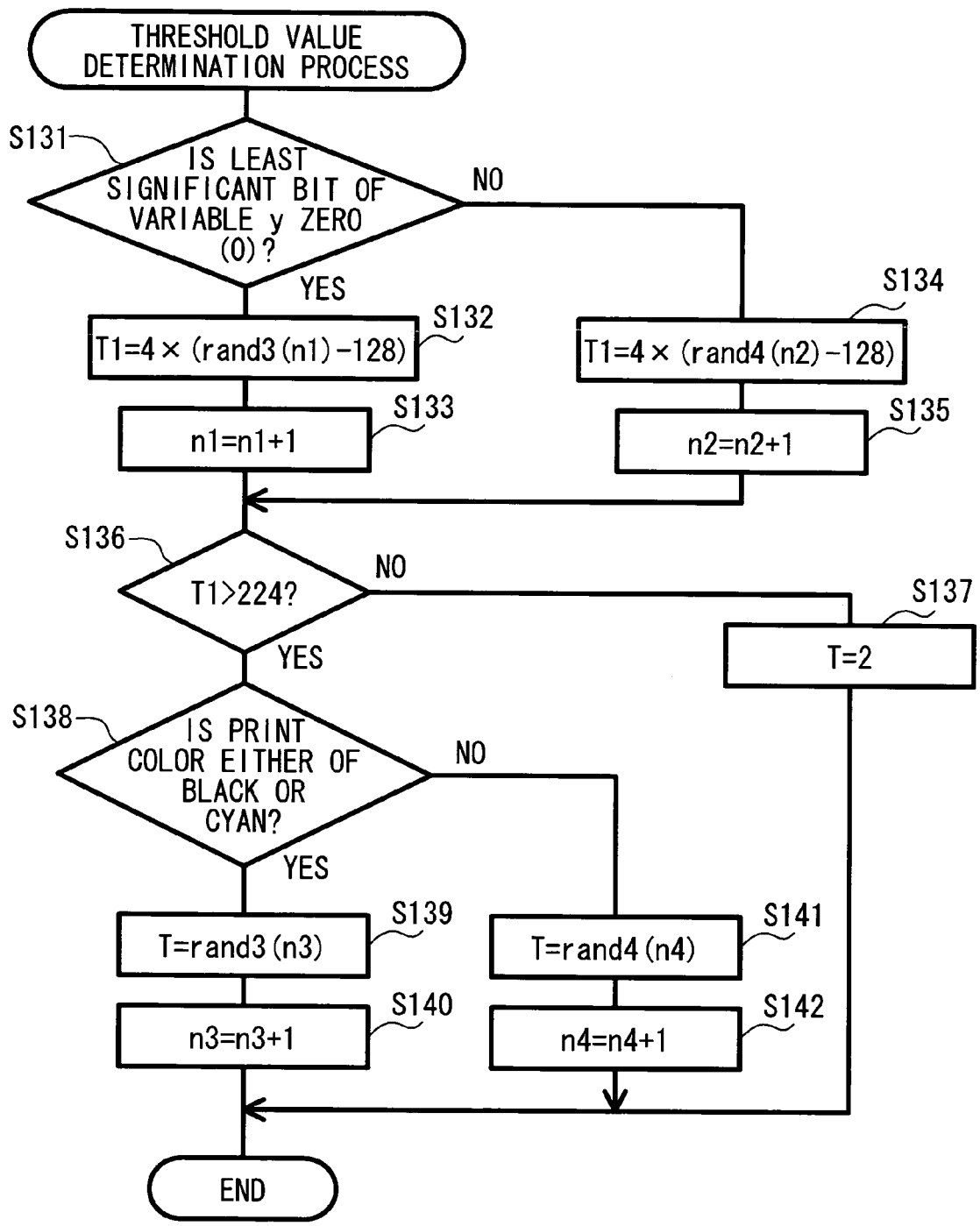
FIG. 11 is a flowchart of a fifth variation of the threshold value determination process.

At a threshold value determination process of FIG. 11, the third random number table 163 is used in common at both S132 and S139 and the fourth random number table 164 is used in common at both S134 and S141. In this case, also, the third common random number table 163 and the fourth common random number table 164, each of which stores 129 random numbers in the range of 64 to 192, are used, so that each variable n1, n2, n3, n4 takes on an integral value in the range of zero (0) to 128, each of which represents each random number between 0 to 128. Therefore, at S101 of the halftoning (FIG. 3), the initial values of the variables n1, n3, and the initial values of the variables n2, n4 may be set to different values from each other (for example, n1=0, n3=50, n2=0, n4=50). By doing so, even when one common random number table is used in order to determine the value of the variable T1 and another common random number table is used in order to determine the threshold value T, the same effect that is obtained by the case where the random number tables to be used are changed like the threshold value determination process of FIG. 5, can be obtained. As in the case of FIG. 10, at the threshold value determination process of FIG. 11, when the value obtained at S132 or S134 is smaller than −255, the value may be set to −255, and when the value is greater than 255, the value may be set to 255.

In the printer 100 of the first embodiment, with respect to each pixel of each print color, the threshold value T is determined by the threshold value determination process (FIG. 5), but it is not limited to the embodiment. For example, without performing the threshold value determination process, the output density O may be set to zero (0) when an obtained value of the modified density I' is one (1) or smaller, and the output density O may be set to 255 when the obtained value of the modified density is 192 or greater.

In the first embodiment of the printer 100, the random numbers are generated by using the first to fourth random number tables 161 to 164. However, the random numbers may be generated without using the random number tables.

Figure 12:
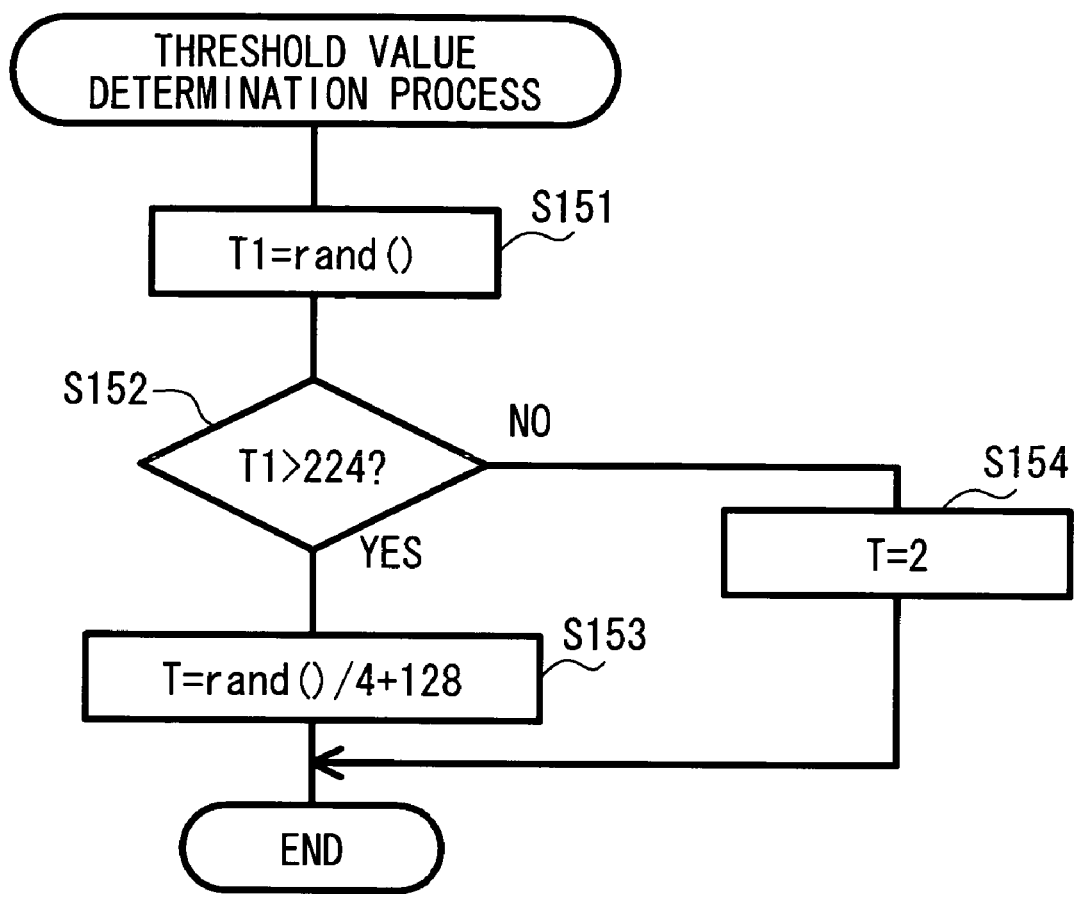
FIG. 12 is a flowchart of a sixth variation of the threshold value determination process.

That is, at a threshold value determination process of FIG. 12, at S151, a random number value in the range of −255 to 255 is generated by calculation and the generated random number value is substituted into the variable T1. Then, at S152, it is determined whether the value of the variable T1 is greater than 224.

When the value of the variable T1 is greater than 224 (S152:YES), flow moves to S153. At S153, as in the case of S151, a random number value is generated in the range of −255 to 255 by calculation. Then, the generated random number value is divided by 4, and 128 is added to the value obtained by the division. Then, the obtained value is determined as the threshold value T, and the threshold value determination process is finished. When it is designed such that the decimal places are rounded off to an integer in a case where the obtained value includes decimal places, the high threshold value T takes on a random number value in the range of 64 to 192, as is the case of the first embodiment. The decimal places may be rounded down or up to an integer.

When the value of the variable T1 is not greater than 224 (i.e., the value of the variable T1 is 224 or smaller) (S152: NO), flow moves to S154. At S154, two (2) is determined as the threshold value T, and then, the threshold value determination process is finished.

As described above, according to the threshold value determination process of FIG. 12, the process, which is similar to the threshold value determination process (FIG. 5) of the first embodiment, can be performed without using the random number tables. Therefore, the storage capacity of the ROM 130 can be downsized. At the threshold value determination process of FIG. 12, the processes of S151 and S152 function as a threshold value selecting device. The process of S151 functions as a random number calculating device. The processes of S153 and S154 function as a setting device. More specifically, the process of S153 functions as a second setting device, and the process of S154 functions as a first setting device.

Figure 13:
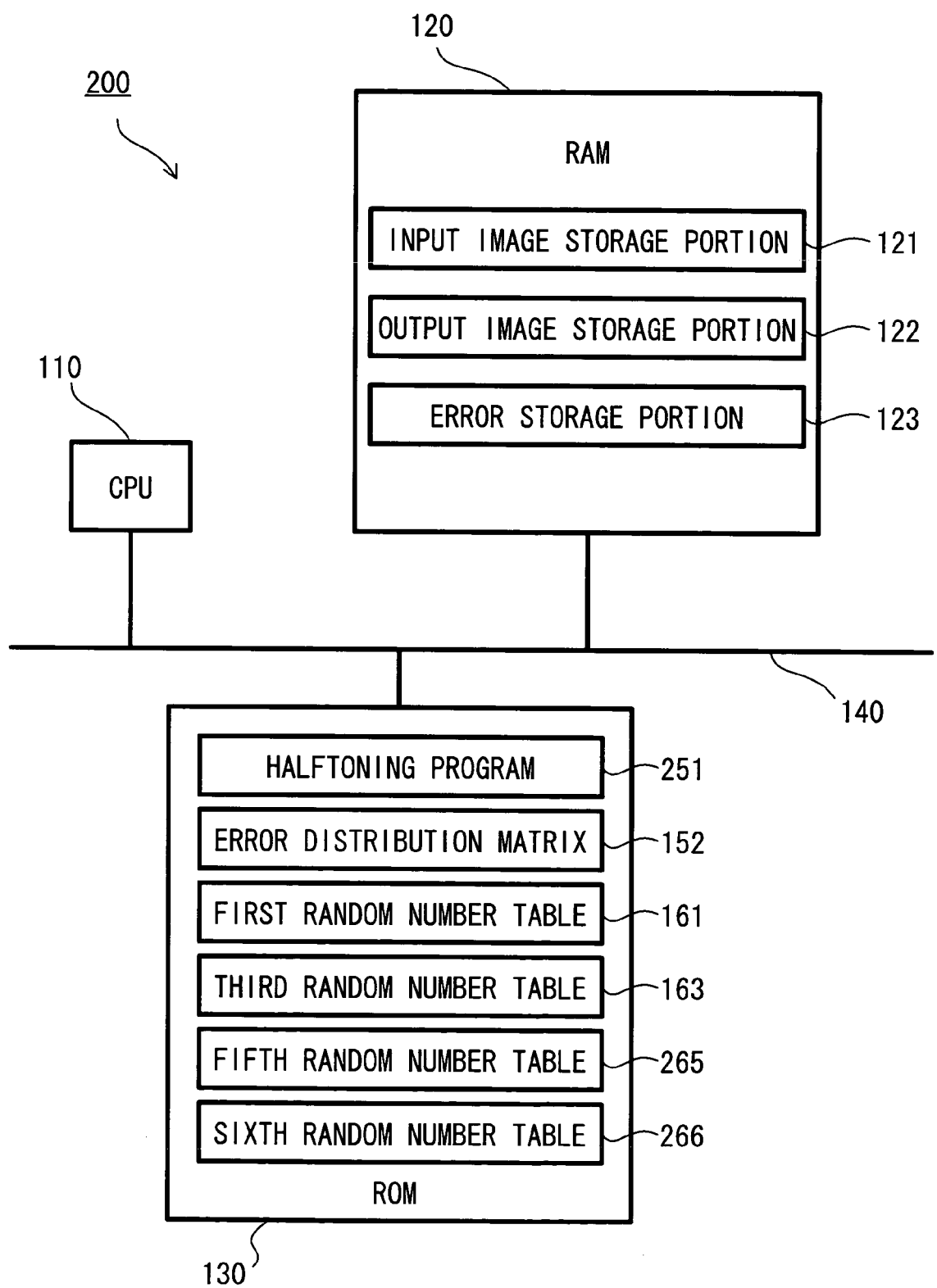
FIG. 13 is a block diagram showing a schematic configuration of a printer of a second exemplary embodiment.

Next, a printer 200 of a second exemplary embodiment will be described. As shown in FIG. 13, the printer 200 basically has the same structure as the printer 100 (FIG. 1) of the first embodiment. Therefore, in FIG. 13, the same parts are designated by the same numerals, and explanations for those parts will be omitted.

The ROM 130 of the printer 200 stores a halftoning program 251 whose contents are partially different from the halftoning program 151 of the first embodiment. The ROM 130 of the printer 200 also stores the first and third random number tables 161, 163, but does not store the second and fourth random number tables 162, 164. Instead of those random number tables 162, 164, the ROM 130 of the printer 200 stores a fifth random number table 265, which stores integer values in a range of zero (0) to 32 in random order as random numbers, and a sixth random number table 266, which stores integer values in a range of zero (0) to 16, in random order, as random numbers.

Figure 14:
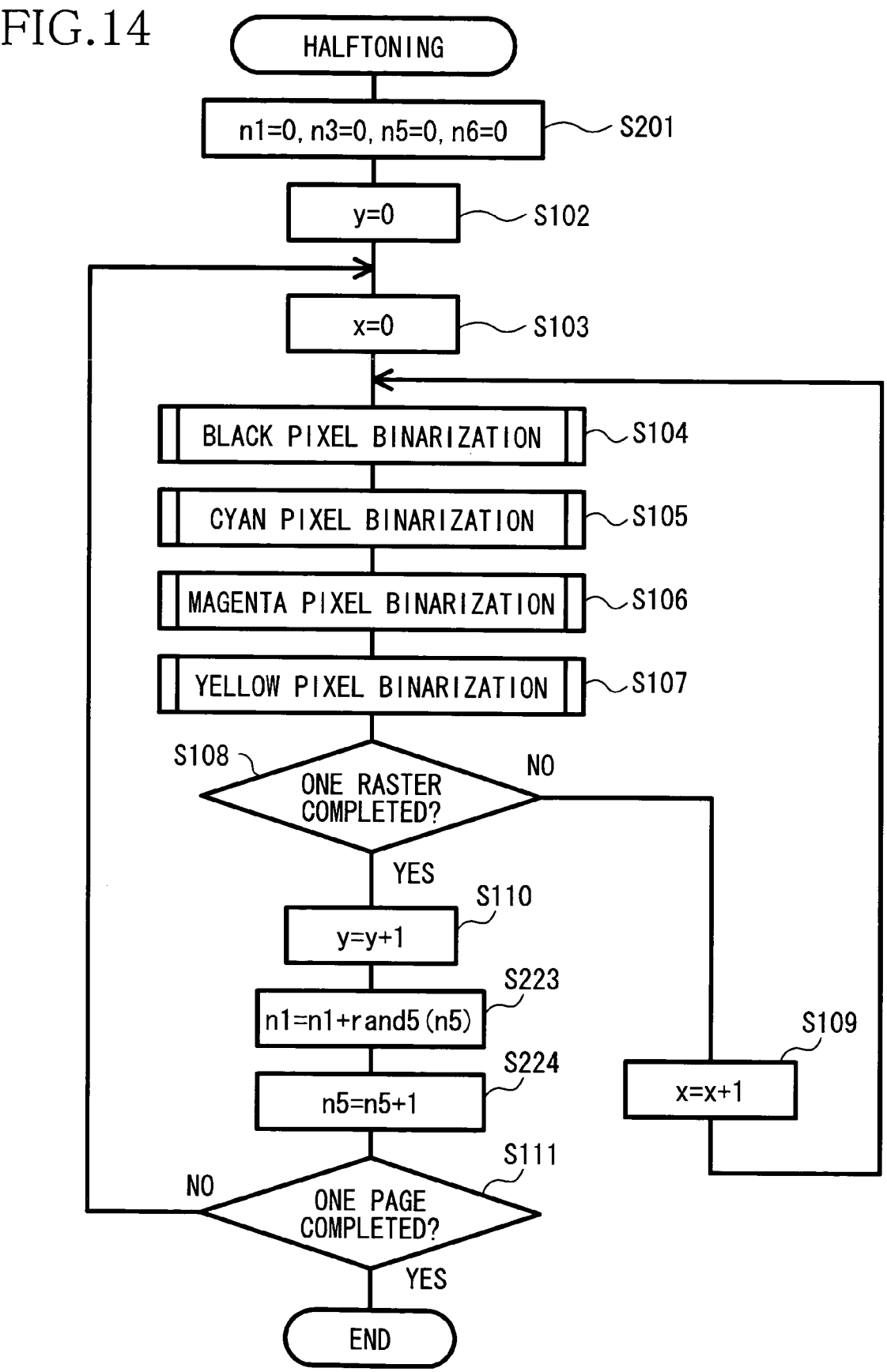
FIG. 14 is a flowchart of halftoning of the second exemplary embodiment.

Halftoning to be performed by the CPU 110 according to the halftoning program 251 stored in the ROM 130 will be described with reference to FIG. 14. When compared to the halftoning (FIG. 3) of the first exemplary embodiment, the halftoning of the second exemplary embodiment includes a process of S201 instead of the process of S101 of the first exemplary embodiment, and processes of S223 and S224 to be performed between S110 and S111, and the contents of the threshold value determination processes to be performed at S104 to S107 are different from those of the first exemplary embodiment. The other parts of the halftoning of the second exemplary embodiment is the same as that of the first exemplary embodiment. Therefore, the same processes are designated by the same numerals, and explanation for those processes will be omitted.

When the halftoning starts, at S201, values of variables n1, n3, n5, n6, each of which represents a reference position of a random number in each random number table 161, 163, 256, 266, are set to respective initial values. More specifically, the value of the variable n1 representing a reference position of a random number in the first random number table 161, the value of the variable n3 representing a reference position of a random number in the third random number table 163, the value of the variable n5 representing a reference position of a random number in the fifth random number table 256, and the value of the variable n6 representing a reference position of a random number in the sixth random number table 266, are set to zero (0).

At S223, the value of a random number, which exists at the reference position indicated by the variable n5 in the fifth random number table 265, is added to a value of the variable n1. Then, at S224, one (1) is added to the value of the variable n5. That is, at the halftoning of the embodiment, the value of the variable n1 is randomly changed after every one raster of the process is finished.

Figure 15:
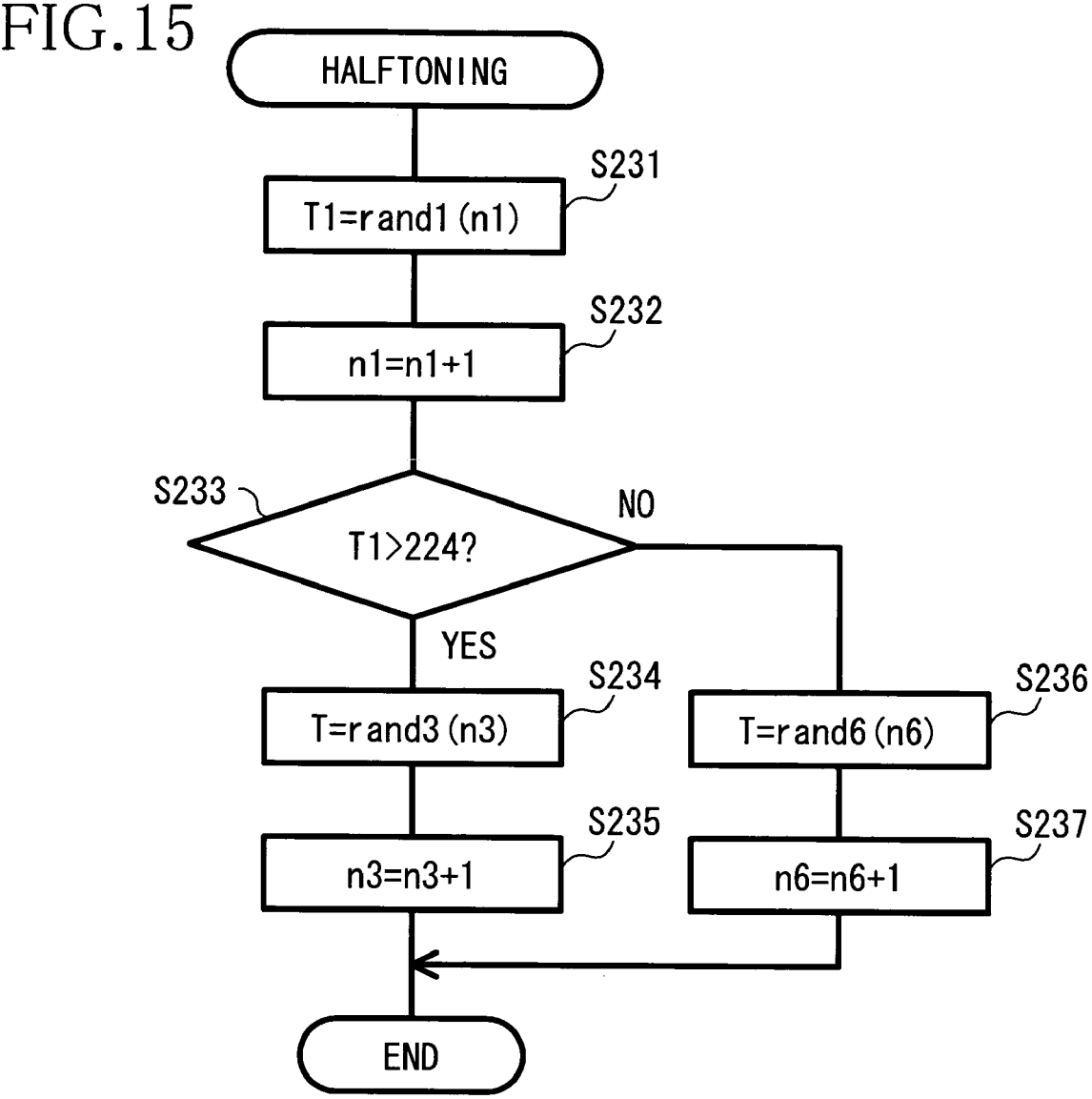
FIG. 15 is a flowchart of a threshold value determination process of the second exemplary embodiment.

Next, a threshold value determination process of the second embodiment will be described with reference to FIG. 15. When the threshold value determination process starts, at S231, the value of the random number, which exists at the reference position indicated by the variable n1 in the first random number table 161, is substituted into the variable T1. Then, at S232, one (1) is added to the value of the variable n1.

At S233, it is determined whether the value of the variable T1 is greater than 224. When the value of the variable T1 is greater than 224 (S233:YES), flow moves to S234. At S234, the value of the random number, which exists at the reference position indicated by the variable n3 in the third random number table 163, is determined as the threshold value T. Then, at S235, one (1) is added to the value of the variable n3. The threshold value determination process is finished.

When the value of the variable T1 is not greater than 224 (i.e., the value of the variable T1 is 224 or smaller) (S233: NO), flow moves to S236. At S236, the value of the random number, which exists at the reference position indicated by the variable n6 in the sixth random number table 266, is determined as the threshold value T. Then, at S237, one (1) is added to the value of the variable n6, and the threshold value determination process is finished.

As described above, at the threshold value determination process of the second exemplary embodiment, the low threshold value T takes on a random number value in the range of zero (0) to 16. As is the case of the first embodiment, the low threshold value T is selected with extremely high probability, as compared with the high threshold value T (T=a random number in the range of 64 to 192). Basically, the low threshold value T is selected. Although the low threshold value T takes on a random number value as distinct from the first embodiment, the range of the random numbers is extremely narrow (the range is between zero (0) and 16) as compared with the range of the high threshold value T (the range is between 64 and 192). Accordingly, dots can be uniformly diffused as is the case where the error diffusion is performed by using a fixed threshold value. In addition, like the first embodiment, the high threshold value T (T=a random number in the range of 64 to 192) is selected with low probability, so that the dots can be prevented from being regularly generated as in the case of the error diffusion using the fixed threshold value.

In the printer 200 of the second exemplary embodiment, the processes of S231 to S233 function as a threshold value selecting device. The processes of S234 and S236 function as a setting device. More specifically, the process of S234 functions as a second setting device and the process of S236 functions as a first setting device.

As described above, in the printer 200 of the second exemplary embodiment, by the threshold value determination process, the low threshold value T (T=a random value in the range of zero (0) to 16) is selected with high probability and the high threshold value T (T=a random value in the range of 64 to 192) is selected with low probability. Therefore, according to the printer 200, a moiré and unevenness can be prevented from being developed on an output image even when the binarization is performed on an input image having low and uniform density, like the first exemplary embodiment. Accordingly, in the second exemplary embodiment, also, the small-sized error distribution matrix 152 can be used, so that the processing time can be shortened.

In the printer 200, like the first exemplary embodiment, the high threshold value T takes on a random number in the range of 64 to 192. Therefore, the effect of preventing the regular dot placement can be improved.

In the printer 200, like the first exemplary embodiment, the random numbers are generated by using the random number tables. Therefore, the processing speed can be improved as compared with the case where the random numbers are generated by calculation.

Specifically, in the printer 200, at the halftoning (FIG. 14), the value of the variable n1 is randomly changed every after one raster of the process is finished (S223, S224). Thus, according to the printer 200, like the first exemplary embodiment, the dots can be further surely prevented from being regularly placed. That is, if the value of the variable n1 is not randomly changed, a low threshold value and a high threshold value are selected in the same order at the processes of adjacent lines when the number of random numbers to be referred to from the random number table 161 for processing one line of image data is the same as the number of random numbers stored in the random number table 161. Thus, the dots may be regularly generated and placed in the sub-scanning direction (in the y-axis direction). In contrast to this, at the threshold value determination process of the second exemplary embodiment, because the value of the variable n1 representing the reference position of a random number in the first random number table 161 to be used for determining the value of the variable T1 is changed line by line, the dots can be prevented from being regularly generated and placed on the output image.

In the printer 200 of the second exemplary embodiment, at the halftoning (FIG. 14), the value of the variable n1 is changed after every one raster of the process is finished, but it is not limited to the described exemplary embodiment.

Figure 16:
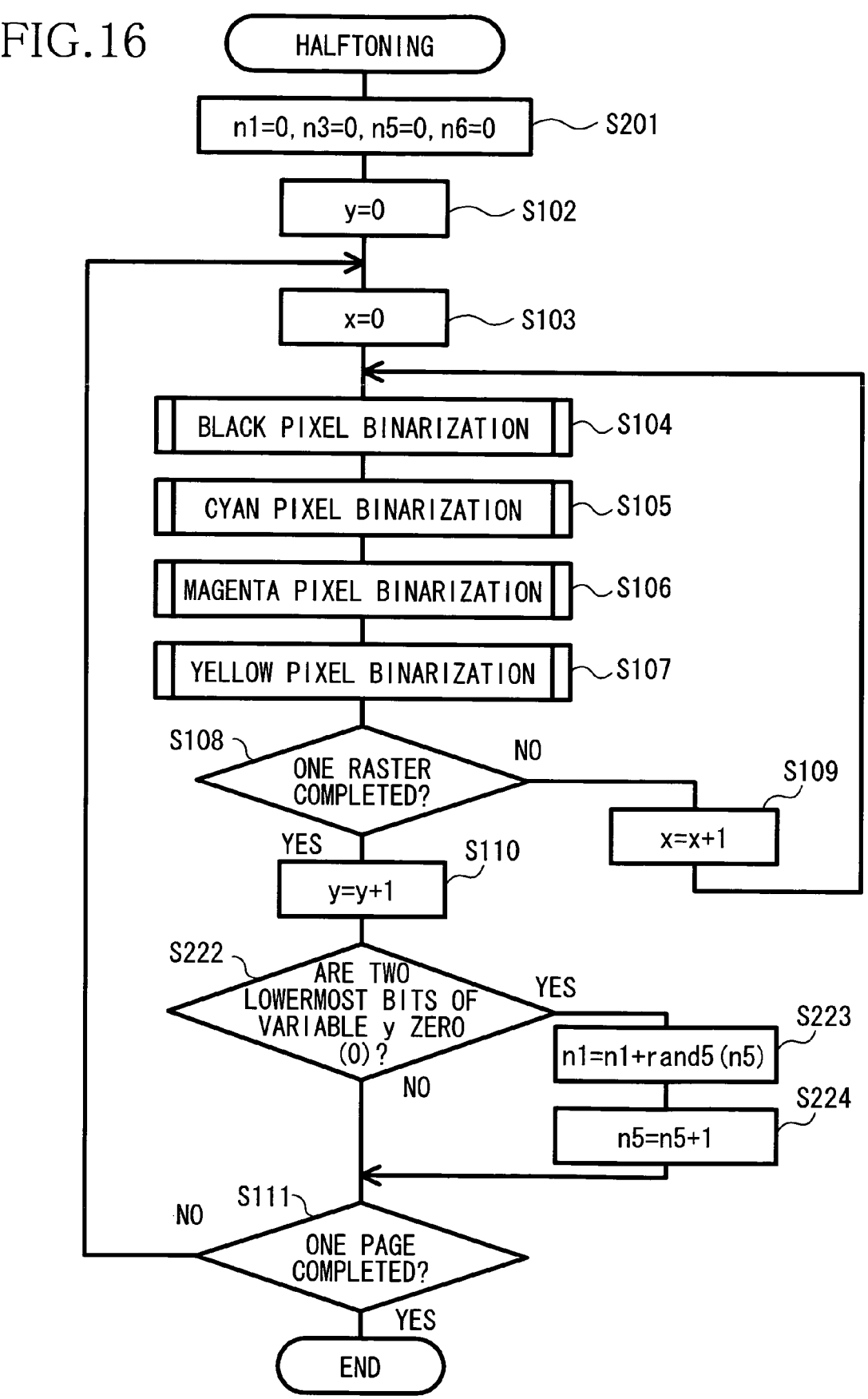
FIG. 16 is a flowchart of a variation of the halftoning.

For example, as shown in FIG. 16, at S222 after S110, it may be determined whether the two lowermost bits of the variable y represented in binary notation are zero (0). The processes of S223 and S224 are performed only when the two lowermost bits are zero (0) (S222:YES). By doing so, the value of the variable n1 is changed once every time four rasters of the process is finished.

For example, a random number whose value is changed may be generated every time one raster of the process is finished, and at S222 of FIG. 16, and it may be determined whether the two lowermost bits of the variable y represented in binary notation are zero (0). By doing so, every after one raster (or m-lines, or m-rasters) of the process is finished, the changing or the not-changing of the value of the variable n1 is randomly selected.

While the invention has been described in detail with reference to the specific embodiments thereof, it would be apparent to those skilled in the art that various changes, arrangements and modifications may be applied therein without departing from the spirit and scope of the invention.

In the above described exemplary embodiments, the high threshold value T takes on a random number value. However, it is not limited to the above embodiments. The high threshold value T can take on a fixed value.

In the above described exemplary embodiments, the threshold value T is determined by randomly selecting one of the low threshold value T and the high threshold value T. However, the threshold value T may be randomly selected from three or more alternatives.

In the above described exemplary embodiments, the error distribution matrix 152 of FIG. 2 is used. An error distribution matrix of FIG. 17 or 18 may be used as their size is smaller than the size of the conventional error distribution matrix of FIG. 19. Because the error distribution matrices of FIGS. 17 and 18 are small, the processing time can be shortened.

In the above-described exemplary embodiments, the example that the pseudo halftone image data is generated by binarizing the 256 levels input image data by the error distribution process has been described. However, it is not limited to the above-described exemplary embodiments. That is, although the output density O is binarized and represented by 255 or zero (0) by determining whether the modified density I' is greater than or equal to the threshold value T in the above-described embodiments, the output density O may be expressed by several indications according to the types of dots when the printer can output various sizes of dots (a multilevel conversion). More specifically, in a case where the printer can output three sizes of dots (large, middle, small), a large dot is assigned when the modified density I' is a value which is greater than or equal to a predetermined value (=the threshold value T obtained at each embodiment described above +128), a middle dot is assigned when the modified density I' is greater than or equal to a predetermined value (=the threshold value T+64), and a small dot is assigned when the modified density I' is greater than or equal to the threshold value T.

When the printer can output dots of the same color materials (light color ink) having different densities, each pixel in output image data can be expressed by the color material having the different density by changing the color material to be used for each pixel, in accordance with the value of the modified density I' of each pixel. For example, in a case where the printer can output dots of two color materials having different densities in the same color, a color material of heavy density is assigned when the modified density is greater than or equal to a predetermined value (=the threshold value T obtained at each embodiment described above +128), and a color material of light density is assigned when the modified density I' is below a predetermined value (=the threshold value T+128).

The invention can be applied to other equipment or devices, such as copying machines and personal computers, as well as printers.

What is claimed is:

1. An image processing device that performs an error diffusion on multilevel input image data to generate multilevel output image data that has fewer levels than the multilevel input image data, comprising:
   a plurality of setting devices, each of which sets a threshold value to be used at the error diffusion, the plurality of setting devices including at least a first setting device and a second setting device that sets a threshold value which is higher than a threshold value set by the first setting device;
   a threshold value selecting device that randomly selects one of the plurality of setting devices with respect to each pixel to be processed and allows the selected setting device to set a threshold value with respect to the pixel to be processed when the image processing device performs the error diffusion; and
   a converting device that converts the pixel to be processed into multilevel output image data with fewer levels than multilevel input image data by the error diffusion, in accordance with the threshold value set by the setting device selected by the threshold value selecting device.

2. The image processing device according to claim 1, wherein the threshold value selecting device selects the first setting device with greater probability than the second setting device.

3. The image processing device according to claim 2, wherein a ratio of selecting the first setting device to the second setting device is higher than 1:1 and lower than 63:1.

4. The image processing device according to claim 1, wherein the second setting device sets a random number value as the threshold value.

5. The image processing device according to claim 4, wherein the random number value which is set as the threshold value by the second setting device is generated in a range of L/4 to 3L/4 when a maximum pixel density of the input image data is L-1.

6. The image processing device according to claim 4, wherein the first setting device sets a random number value in a range which is narrower than a range of the threshold value set by the second setting device, as the threshold value.

7. The image processing device according to claim 6, wherein the first setting device sets a random number value of 16 or smaller, as the threshold value.

8. The image processing device according to claim 1, wherein the first setting device sets a fixed value of 8 or smaller, as the threshold value.

9. The image processing device according to claim 1, further comprising a random number generator that stores a random number table which stores a plurality of values in a predetermined random order, wherein the threshold value selecting device selects one of the setting devices, based on a random number referred to from the random number generator in a predetermined order.

10. The image processing device according to claim 9, wherein the random number generator includes a plurality of random number tables, each of which stores a plurality of values in different order from the other random number tables, and the threshold value selecting device selects the random number table, which is different from the previously-selected random number table, and refers to a random number from the random number generator every time m-line(s) (m=whole number) of pixels is processed.

11. The image processing device according to claim 9, wherein the threshold value selecting device stores a plurality of variables whose values are changed in predetermined order every time the variables are selected, adopts one of the plurality of variables as a value representing a stored position of a random number in the random number table and refers to a random number existing at the stored position indicated by the variable, and wherein the variable is changed to one of the other variables every time m-line(s) of pixels is processed.

12. The image processing device according to claim 9, wherein the threshold value selecting device takes on one of differing values, each of which represents a stored position of each random number stored in the random number table, and refers to a random number existing at the stored position indicated by a variable, from the random number table, by using the variable whose value is changed in predetermined order with respect to each pixel to be processed, and wherein an initial value of the variable is randomly changed every time m-line(s) of pixels is processed.

13. The image processing device according to claim 1, comprising a random number calculator that generates a random number by calculation, wherein the threshold value selecting device selects the setting device, based on the random number generated by the random number calculator.

14. The image processing device according to claim 9, generating output image data of each color by performing the error diffusion on input image data of each color that represents a color image by overlapping each other, wherein the random number generator includes a plurality of random number tables, each of which stores a plurality of values in different order from the other random number tables, and the threshold value selecting device selects the random number table, which is different from the previously-selected random number table, in accordance with the color of the input image data to be processed, and refers to a random number from the random number generator.

15. The image processing device according to claim 14, wherein varieties of the plurality of random number tables are less than varieties of the plurality of colors.

16. The image processing device according to claim 1, generating output image data of each color by performing the error diffusion on input image data of each color that represents a color image by overlapping each other, the threshold value selecting device storing a plurality of variables whose values are changed in predetermined order every time the variables are selected, adopts one of the plurality of variables as a value representing a stored position of a random number in the random number table and refers to a random number existing at the stored position indicated by the variable, and wherein the variable is changed to one of the other variables in accordance with the color of the input image data to be processed.

17. The image processing device according to claim 1, wherein the multilevel output image data is bi-level output image data.

18. An image processing method of performing an error diffusion on multilevel input image data and generating multilevel output image data having fewer levels than the multilevel input image data, the method comprising the steps of:
   receiving multilevel image data;
   randomly selecting one of a first process, which performs an error diffusion by setting a threshold value of a pixel to be processed in a first setting pattern of a plurality of setting patterns for setting a threshold value to be used at the error diffusion, and a second process, which performs an error diffusion by setting a threshold value in a second setting pattern for setting a threshold value which is higher than the threshold value set in the first setting pattern, of the plurality of setting patterns, when the error diffusion is performed with respect to each pixel to be processed; and generating multilevel image data having fewer levels than the received multilevel image data, with respect to the pixel, by the selected process.

19. A computer-readable medium embodied with an image processing program configured to operate a computer as:

an image processing device that performs an error diffusion on multilevel input image data to generate multilevel output image data with fewer levels than the multilevel input image data;

a plurality of setting devices, each of which sets a threshold value to be used at the error diffusion, the plurality of setting devices including at least a first setting device and a second setting device that sets a threshold value which is higher than a threshold value set by the first setting device;

a threshold value selecting device that randomly selects one of the plurality of setting devices with respect to each pixel to be processed and allows the selected setting device to set a threshold value with respect to the pixel to be processed when the image processing device performs the error diffusion; and a converting device that converts the pixel to be processed into multilevel output image data with fewer levels than multilevel input image data by the error diffusion, in accordance with the threshold value set by the setting device selected by the threshold value selecting device.

* * * * *